United States Patent [19]

Ahlstone

[11] 4,168,853
[45] Sep. 25, 1979

[54] SHIFTABLE RING GASKET RETAINER FOR FLANGED CONNECTORS

[75] Inventor: Arthur G. Ahlstone, Ventura, Calif.

[73] Assignee: Vetco, Inc., Ventura, Calif.

[21] Appl. No.: 804,625

[22] Filed: Jun. 8, 1977

[51] Int. Cl.² ............................................. F16L 17/06
[52] U.S. Cl. .................... 285/336; 277/180; 277/189; 285/363; 285/379
[58] Field of Search .................. 285/18, 23, 24, 27, 285/336, 334.2, 363, 379, 380, DIG. 18; 277/9.5, 10, 11, 171, 180, 167.5, 189

[56] References Cited
U.S. PATENT DOCUMENTS

| | | | |
|---|---|---|---|
| 2,291,709 | 8/1942 | Goetze | 285/336 |
| 2,753,197 | 7/1956 | Loeffler | 285/336 |
| 2,863,679 | 12/1958 | Dunburk | 285/336 |
| 3,350,103 | 10/1967 | Ahlstone | 277/167.5 X |
| 3,387,867 | 6/1968 | Rogers | 285/336 |
| 3,521,892 | 7/1970 | Sheesley et al. | 285/336 X |
| 3,628,812 | 12/1971 | Larralde | 285/334.2 X |
| 3,661,408 | 5/1972 | Gibbons | 285/18 |
| 3,857,572 | 12/1974 | Taylor et al. | 277/9.5 |

FOREIGN PATENT DOCUMENTS 4635801  2/1968  Japan ................................ 277/167.5

Primary Examiner—Dave W. Arola
Attorney, Agent, or Firm—Subkow and Kriegel

[57] ABSTRACT

A ring gasket is retained in position on a pipe connector flange with the ring gasket properly positioned for sealing engagement and loading between opposed circular grooves in the flange and a mating flange or member. The ring gasket is supported on one of the connector parts by a spacer ring or by a portion of the flange which effects a standoff between the connector parts when they are connected. The support for the ring gasket includes a flexible connection between the inside of the spacer ring and the outer periphery of the ring gasket. The ring gasket has outer peripheral, oppositely tapered sealing surfaces loaded into sealing engagement with opposing companion surfaces forming the grooves in the flanges upon making up of the connection, and a slidable connection between the spacer ring and the ring gasket supports the ring gasket for such axial movement of the ring gasket as is necessary to enable loading thereof.

21 Claims, 9 Drawing Figures

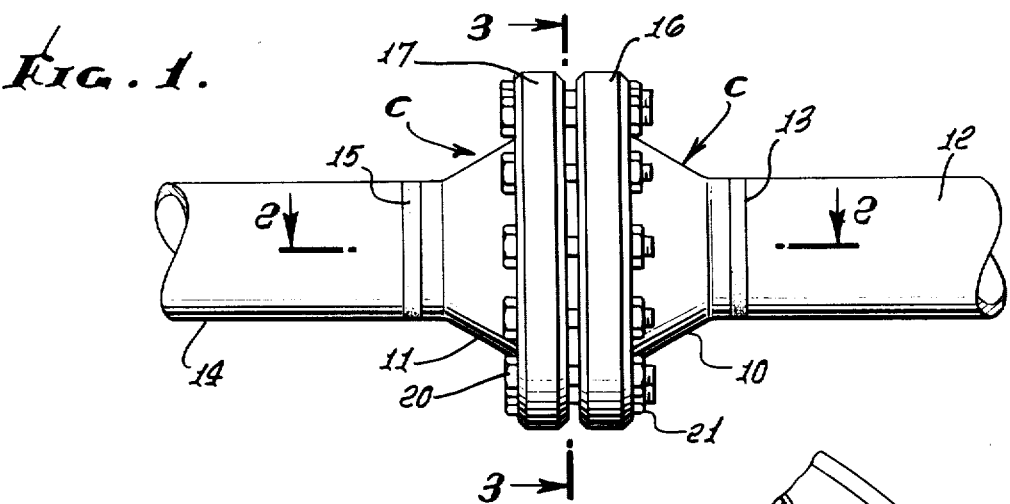
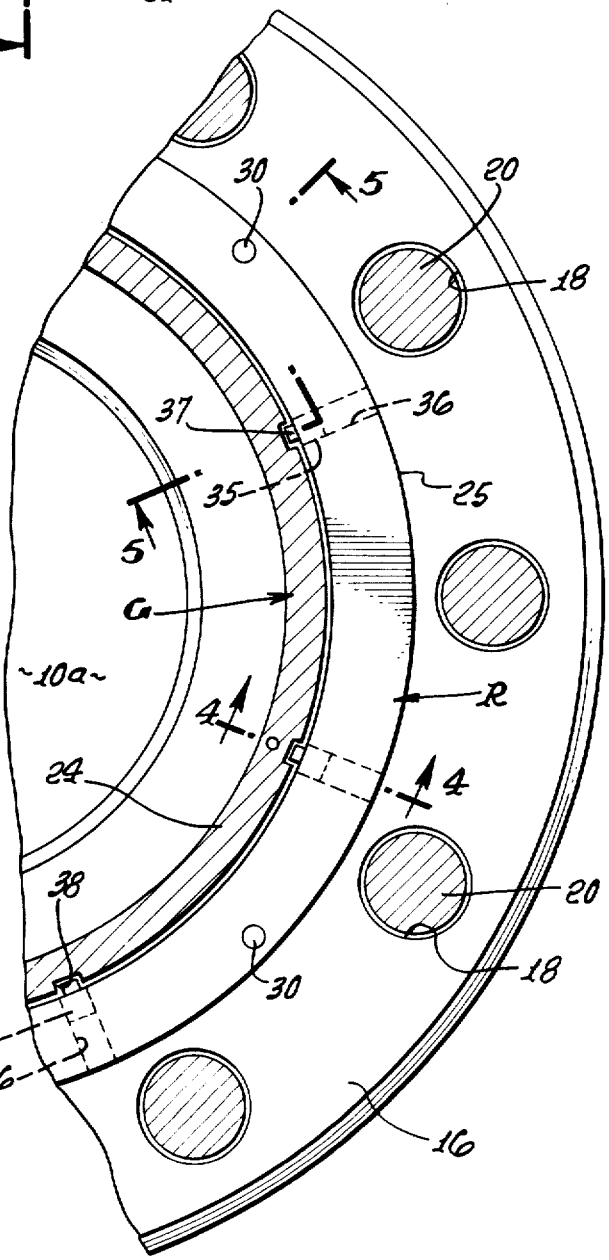
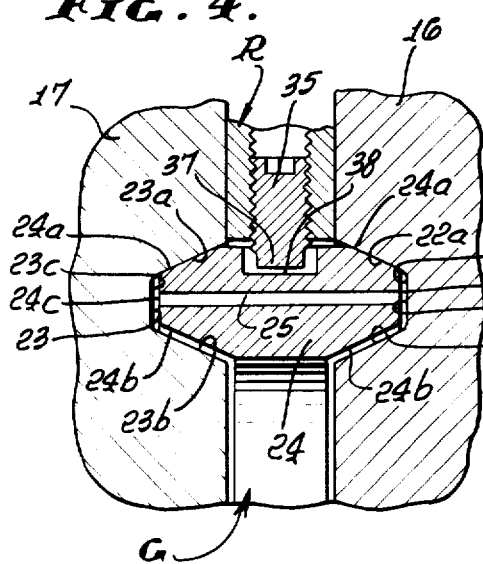

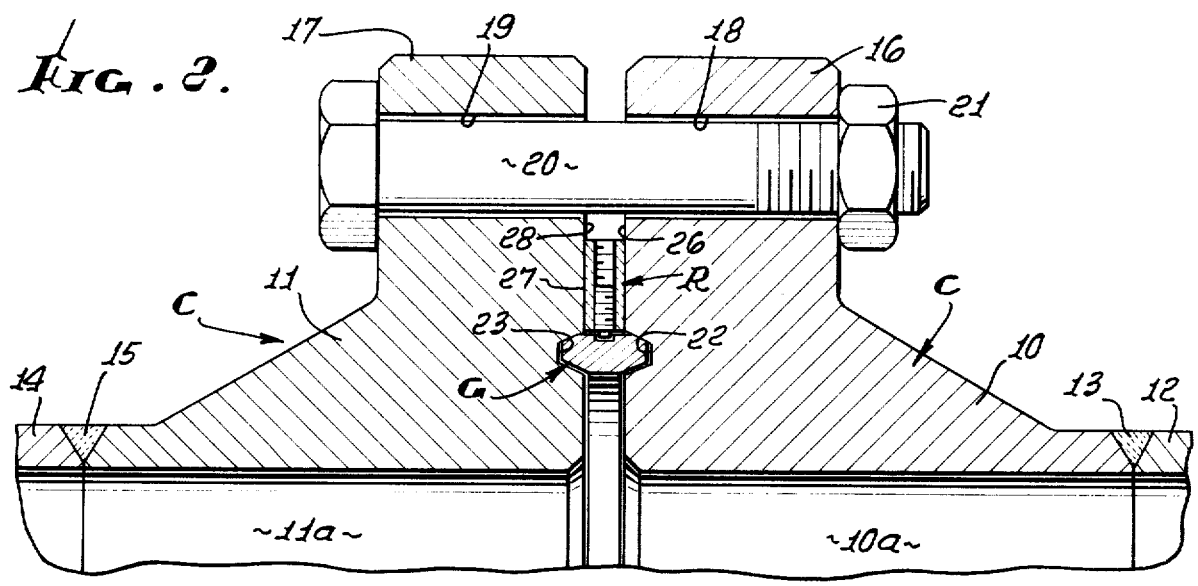
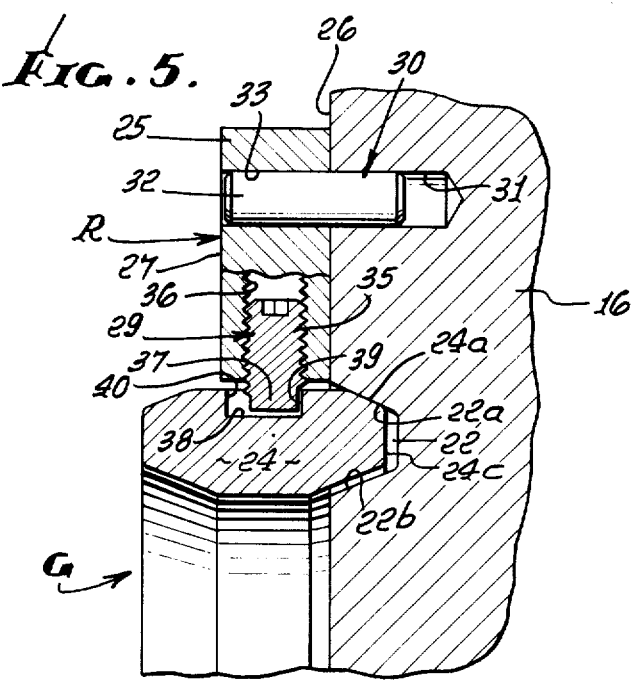
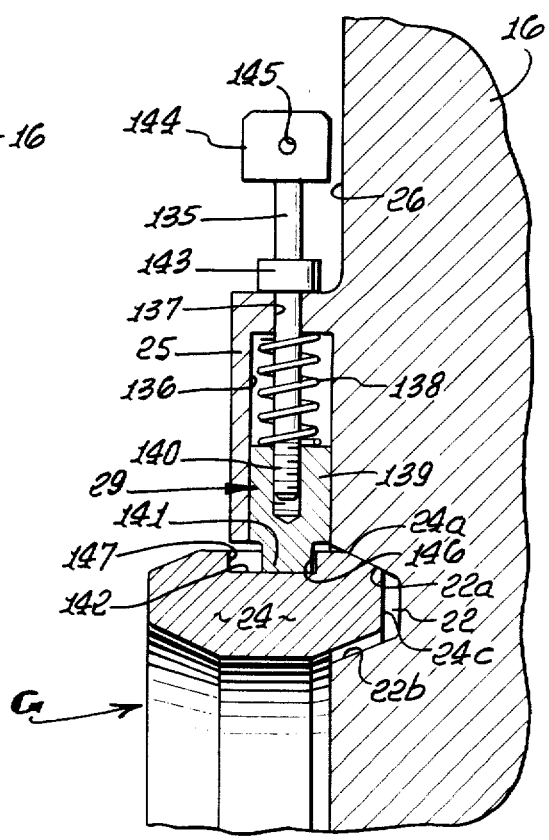

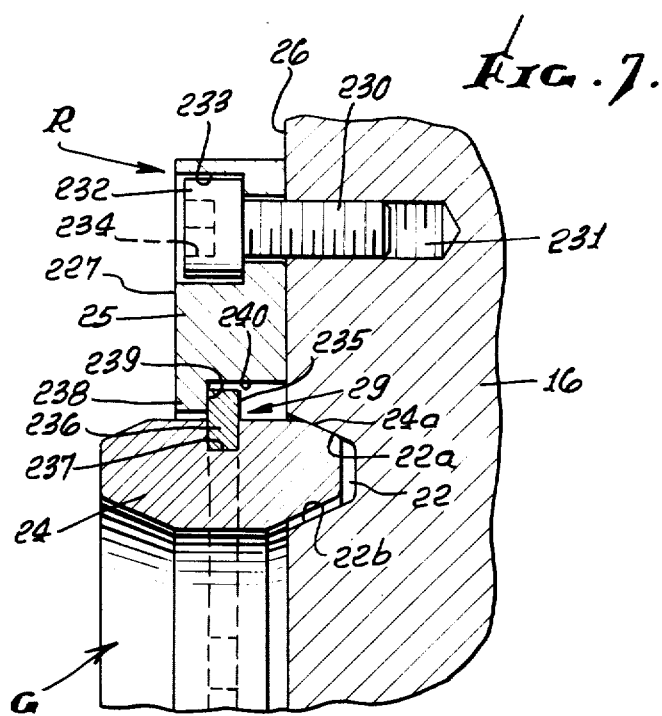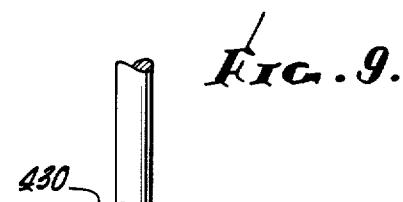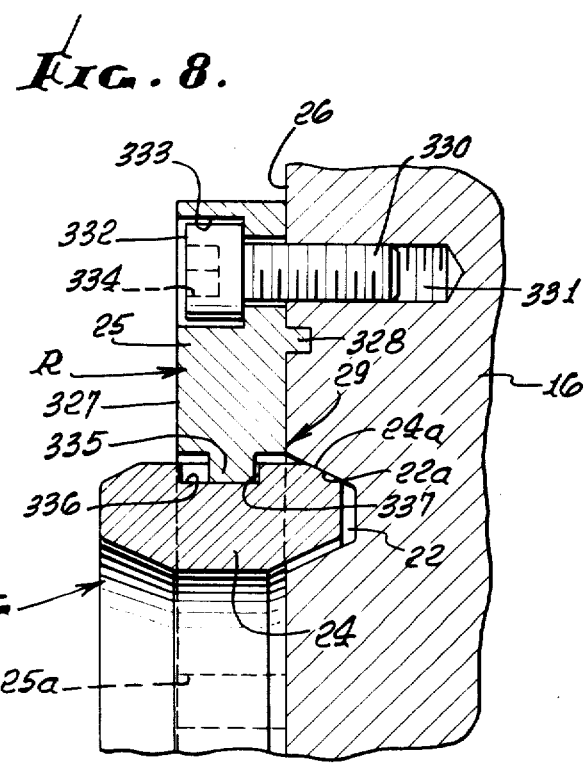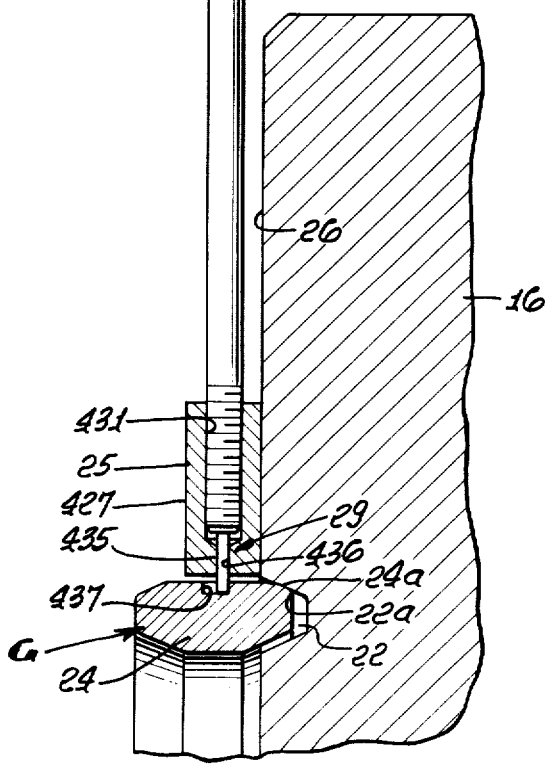

SHIFTABLE RING GASKET RETAINER FOR FLANGED CONNECTORS

BACKGROUND OF THE INVENTION

Flanged pipe connections for pipe lines, well heads and the like commonly involve the interconnection of opposed flanges or a flange and another member to engage and load a soft iron ring gasket in opposing circular grooves in the confronting flange or member surfaces. Such connectors are, for example, the subject of specifications of the American Petroleum Institute (API) and have become standardized.

When such connections are being made up with flanges or members disposed horizontally or nearly horizontally, initial manual positioning or locating of the ring gasket in an upwardly opening circular groove is a relatively simple matter. The bringing or stabbing together of the connector parts may also be relatively simple. In the case of connections being made under stable conditions, on land, if the ring gasket tends to shift laterally, it is also a simple matter to manually hold the ring gasket in place as the connector parts are moved together, although there is danger of hand or finger injury.

Such connections, however, are also being widely used in unstable or difficult environments, for example, for underwater pipe lines and connectors where divers are employed to make up the connectors, and the manual holding of the ring gasket in position is very difficult and tricky, particularly if the diver or divers are required to manually push or pull on the connector parts to bring them into position for connection. The problems are accentuated where the connector is being made up in a horizontal or other non-vertical pipe line or connector.

As disclosed in my companion application for patent, Ser. No. 804,726, filed June 8, 1977, means are provided for initially positioning and locating a ring gasket with respect to the circular groove in one flange connector part, so that the ring gasket is properly positioned for sealing engagement in both of the opposed circular grooves of the companion connector parts when the connector is made up.

More particularly, means are provided for supporting the ring gasket on or adjacent to one of the connector parts, so that the ring gasket remains in proper position for engagement in the grooves of the connector parts, without regard for the angle at which the connector parts may be disposed during makeup. Accordingly, in the case of an underwater connection made up by a diver or divers, the difficult task of manually positioning the ring gasket between the flanges and the hazard to the hands are avoided. The invention renders more safe the making up of such connections even under more stable or surface conditions, and even when the connector parts are on vertical axes, the locating of the ring gasket for proper engagement between the connector parts is assured.

The offshore oil and gas industry has standardized on the use of ring gaskets of the type designated "RX" or "BX" by the API. Reference is made to the "API SPECIFICATION FOR WELL-HEAD EQUIPMENT", API Spec. 6A, Tenth Edition, March, 1974, American Petroleum Institute, Division of Production, Dallas, Tex., pages 33 and 34, for examples of such ring gaskets and companion grooves in flange connections. The present invention is particularly directed towards supporting and positioning such ring gaskets, but is also applicable to the type "R" ring gaskets, see the API specification, page 32, for examples.

Connectors of the type here involved, because of the standards by which the parts are made, cannot be easily or acceptably modified in a significant manner. The connectors using the "RX" type ring gaskets are made up with a load carrying spacer ring between the confronting faces having the grooves which receive the ring gasket or with the confronting faces in engagement. Any variation may result in an ineffective loading of the ring gasket by the sealing walls which form one side of the grooves. On the other hand, "BX" type ring gaskets are normally used in connectors which are made up with the opposing, groove containing surfaces in abutting engagement, and the ring gasket may be deformed into engagement with both side walls of one or both of the grooves.

Broadly speaking, the invention relates to supporting and positioning the ring gasket for engagement in the grooves of the connector or flange parts. Specifically, the invention relates to supporting and positioning the ring gasket of the above-identified "RX" type for engagement in the grooves of the connector or flange part by means of a spacer ring or flange part which limits the movement of the connector parts together, the ring gasket being initially loaded between opposing groove surfaces in the respective connector parts and being pressure loaded from within the connector. In the forms of the invention herein disclosed, in a specific sense, the spacer is a ring connected to or supportable adjacent to one connector part or an abutment flange portion and having means holding the ring gasket in position in the groove of that part in contact with the outer marginal sealing wall of the groove, so that when the companion connector part is assembled against the gasket ring, the ring will engage the other outer sealing wall and be loaded between the sealing walls, to an extent determined by the spacer or flange portion for pressure response from the internal fluid to maintain the seal over the full range of pressures for which the connector is designed.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense.

Referring to the drawings:

FIG. 1 is a side elevation showing a pipe connector incorporating the ring gasket retainer for flanged connectors embodying the invention;

FIG. 2 is an enlarged fragmentary longitudinal section taken on the line 2—2 of FIG. 1;

FIG. 3 is an enlarged fragmentary transverse section taken on the line 3—3 of FIG. 1;

FIG. 4 is a further enlarged fragmentary detailed view in radial section taken on the line 4—4 of FIG. 3;

FIG. 5 is an enlarged fragmentary radial section as taken on the line 5—5 of FIG. 3, illustrating one form of ring gasket retainer, before make up of the connection;

FIG. 6 is a fragmentary radial section generally corresponding to FIG. 5 but showing another form of ring gasket retainer;

FIG. 7 is another fragmentary radial section showing a further form of ring gasket retainer;

FIG. 8 is another fragmentary radial section showing a further form of ring gasket retainer; and FIG. 9 is another fragmentary radial section showing a further form of ring gasket retainer.

As seen in the drawings, a pair of mating connector parts, in the form of flanged connectors C, have tubular housings 10 and 11. One length of pipe 12 is secured to the connector housing 10 by a circumferentially continuous weld 13 and another length of pipe 14 is secured to the other connector housing 11 by a circumferentially continuous weld 15. Each connector housing 10 and 11 has a radially outwardly projecting, circumferentially continuous connector flange designated 16 and 17, respectively. The flange 16 has a suitable number of circumferentially spaced bolt holes 18 and the flange 17 has a corresponding plurality of bolt holes 19, adapted to be aligned when the flange connector is being made up, for the reception of bolts 20, and retaining nuts 21 are adapted to be tightened down on the bolts to load the flanges 16 and 17 together, with a ring gasket G axially preloaded in opposing annular grooves 22 and 23 in the respective connector parts 10 and 11, so that the ring gasket will prevent leakage between the flanges 16 and 17. Such connectors of the flanged type, employing soft iron ring gaskets G, are generally the subject of the above-identified API specification for well head equipment.

Typically when such connectors are being made up and the angle of the pipe is such that the ring gasket does not tend to seat in one of the opposing grooves to be held by gravity in a proper position for engagement between the flanges, the gasket must be manually held in position. Even in the case of fairly large pipe connectors, the holding of the ring gasket in initial position can be hazardous and very difficult, particularly in the case of underwater connections which are being made by divers who are wearing diving gear and gloves which make such manual activities very difficult.

The present invention provides retaining means R for initially supporting the ring gasket G and holding the same in a proper position with respect to one of the grooves in one of the connector parts, while the other connector part is being moved into place and the bolt holes 18 and 19 aligned for reception of the bolts 20 and the application thereto of the nuts 21.

The retaining means are, as herein illustrated in a specific sense, incorporated in spacer means which also function to limit the loading of the connector flanges towards one another and establish a predetermined spaced relation between the flanges and correspondingly between the opposing grooves 22 and 23, for the proper seating, loading and sealing effect of the ring gasket G.

As seen in FIG. 4, the ring gasket G is in preloaded and sealing relation to the opposing flanges 16 and 17 in the opposing respective grooves 22 and 23. The groove 22 is formed in the flange or member 16 by an outer, inclined circumferentially continuous sealing wall 22a, and an opposing inner, inclined wall 22b diverging from a base or bottom wall 22c. Correspondingly, the groove 23 in the flange 17 is formed by an outer, inclined, circumferentially continuous sealing wall 23a and an opposing inclined, inner wall 23b diverging from a base wall 23c. The ring gasket G has a central ring body 24, at each end of which is an outer beveled or tapered wall 24a, adapted to sealingly engage against the opposing inclined walls 22a and 23a of the respective flanges, when the connector parts are brought together by the bolts 20 and nuts 21. Engagement of the confronting beveled walls 22a and 23a with the gasket ring walls 24a establishes an axial and circumferential preload between these sealing flange and gasket ring walls.

The retainer means R, to be more particularly described below, serves to limit movement of the flanges 16 and 17 towards one another, and it is desired that the resultant predetermined spacing between the flanges is such that the opposite end surfaces or walls 24c of the ring gasket are not in sealing contact with the base walls 22c and 23c of the respective grooves, and that neither of the inner peripheral angular surfaces 24c at opposite ends of the ring gasket body are in sealing engagement with the respective groove walls 22b and 23b.

When the connector is properly made up and the ring gasket G is in proper position, as just described above, it will be observed that the pressure of fluid within the fluid passages 10a and 11a of the connector acts across the entire inner periphery of the ring gasket to establish a high pressure loaded unit loading of the opposed angular surfaces 22a and 24a and the opposed angular surfaces 23a and 24a of the flanges and the ring gasket, so that the connector can withstand high pressures, without leaking. In the event that one of the angular ring gasket walls 24b should be caused to engage one of the flange walls 22b or 23b, then fluid pressure can pass between the ring gasket and the other of the walls 22b or 23b to find access to the space between the end surfaces 24c of the ring gasket and the base 22c or 23c of the grooves and can be equalized across the ends of the ring gasket by access to the base of the other groove, through an equalizing port or ports 25, which extend longitudinally through the ring gasket body 24 at a suitable number of circumferentially spaced locations. Such ports 25 are required in some API ring gaskets, but not in others.

Referring more particularly to FIG. 5, the ring gasket retaining means R are adapted to initially support the ring gasket body 24, with one tapered end thereof disposed within the groove 22, and with the other tapered end of the body 24 disposed for engagement within the companion flange groove when the connector is assembled.

Accordingly, the retaining means R comprises an annular support member 25 projecting axially from the end face 26 of the flange 16, and having a flat end face 27 engageable by the opposing end face 28 of the other flange 17, when the connector is assembled, to maintain the proper axial spacing of the two connector parts, so that the ring gasket G is properly preloaded and pressure responsive, as described above.

To accomplish this, the ring gasket G is supported within the retainer ring 25 by means 29 and the retainer ring is positioned or located relatively to the flange 16 so that the ring gasket body has its beveled outer surface 24a initially disposed as seen in FIG. 5 immediately adjacent to or contacting the outer angular wall 22a of the groove 22 in the flange 16, and the support means 29 mount the support ring 25 on the ring gasket body 24 in such a manner that when the companion connector flange 17 is loaded against the spacer ring 25, the ring gasket body is enabled to shift axially to the extent necessary to axially and circumferentially load the opposing angular walls of the ring gasket and the flange grooves.

In FIG. 5, such a structure is shown, according to one form of the invention, wherein the means 29 shiftably support the ring gasket G for axial movement relative to the support ring 25 which is secured against the face 26 of the connector flange 16 by means of a suitable number of circumferentially spaced roll pins or other pins 30 adapted to be tightly driven into a number of circumferentially spaced drilled holes 31 in the connector flange 16 and having outer ends 32 tightly engaging in circumferentially spaced holes 33 in the support ring 25. The connector means 29 includes a number of circumferentially spaced set screws 35 threaded in radial holes 36 in the support ring, circumferentially spaced with respect to the pins 30, and having inner dog ends 37 projecting radially inward beyond the inner periphery of support ring 25, into a corresponding number of circumferentially spaced recesses 38 in the outer periphery of the gasket ring body 24. Of course, the recesses 38 may be provided in the form of a circumferentially continuous outer peripheral groove adapted to receive the dog ends 37 of the set screws 35. In the initial retaining position shown in FIG. 5, in which the beveled surface 24a of the ring gasket body contacts the beveled surface 22a forming the groove 22, the dog end 37 engages one side wall 39 of the recess 38 to maintain the confronting ring and flange surfaces 22a and 24a in, or nearly in, engagement, while the other side wall 40 of the recess 38 is spaced from the dog end 37 of the connecting means so as to enable such axial movement of the gasket ring body as may be required when the ring gasket is being loaded between the confronting flanges 16 and 17, as shown in FIG. 4.

As seen in FIG. 6, the spacer ring 25 is shown as integral with the flange 16, although, if desired, the ring 25 can be a separate element secured to the flange 16 against the radial face 26 thereof. The connecting means 29 is in the form of simple spring loaded latch means. As shown, the latch means 29 includes an elongated latch pin 135 extending into a radial bore 136 in the spacer ring or flange 25 and projecting outwardly through a radial apperature 137 in the outer wall of the flange 25. Disposed about the latch pin 135 is a coiled compression spring 138 which seats against the outer wall of the flange 25 and against a latch dog 139 threaded at 140 to the inner end of the latch pin 135 and having a nose 141 projecting radially past the flange into a dog receiving recess 142 in the outer periphery of the body 24 of the gasket ring G. Projecting radially outwardly from the support ring 25, the latch pin has a stop shoulder 143 and an actuator end 144 having a suitable recess 145 for reception of a pulling tool, whereby the latch pin 135 can be retracted during assembly of the ring gasket G within the inner periphery of the spacer ring or flange 25. As will be understood, a plurality of the latch means 29 will be circumferentially spaced about the flange 16 for engagement in the recess or annular groove 142. The width of the recess 142 is sufficient to enable the necessary axial shifting of the ring gasket G with respect to the retainer means R, and the nose 141 of the latch dog 139 is in initial engagement with one side wall 146 of the recess 142 to hold the confronting beveled surfaces 22a forming the groove and 24a on the ring gasket body in or nearly in engagement, while the other side wall 147 of the recess is spaced from the latch dog nose 141 to enable the necessary axial shifting of the gasket ring into the preloaded and sealing condition like that shown in FIG. 4.

Referring to FIG. 7 another form of the retainer means R is illustrated wherein the spacer ring or flange 25 is secured to the radial face 26 of the connector flange 16, and the connecting means 29 initially supports the body 24 of the ring gasket G in a position with the beveled surface 22a of the groove 22 and the opposed beveled surface 24a of the ring gasket body in or nearly in engagement, but with the ring gasket body shiftably supported for such axial movement as may be necessary in loading the ring gasket between the flanges 16 and 17 in the manner shown in FIG. 4. In this embodiment, the support ring 25 provides the radial face 227 engageable by the flange 17 when the connector is made up to limit the loading of the ring gasket, and the support ring 25 is secured to the radial face 26 of the flange 16 by a suitable number of circumferentially spaced fasteners or cap screws 230 threaded into a corresponding number of circumferentially spaced threaded openings 231 in the flange 16 and having heads 232 disposed in counterbores 233 in the connector ring 25, the heads having suitable tool receiving recesses 234 for tightening the same against the connector ring. The connecting means 29, whereby the ring gasket body 24 is shiftably mounted within the inner periphery of the connector ring 25, comprises a radially projecting flange 235 provided about the outer periphery of the ring gasket body. In the form shown, the flange 235 is provided by installing a split ring 236 in a peripheral outwardly opening groove 237 about the ring gasket body. A flange 238 extends inwardly from the inner periphery of the spacer ring 25 and provides a shoulder 239 facing the flange radial surface 26 and engageable with the external flange 235 of the ring gasket so as to hold the beveled surface 24a of the ring gasket in or nearly in contact with the opposed beveled surface of the flange groove 22. The reduced inside diameter 240 of the spacer ring 25 allows freedom of axial movement of the ring gasket G during loading of the same between the confronting connector parts. As seen in FIG. 8, another form of retaining means R is illustrated. In this form the spacer ring 25 is radially split as at 25a and when connected to the flange 16 provides the radial surface 327 adapted for engagement by the flange 17 upon making up of the connector, while the connecting means 29 between the spacer ring 25 and the ring gasket body 24 allows axial shifting of the ring gasket such as may be required as the ring gasket is being loaded between the companion connector flanges, as illustrated in FIG. 4. The spacer ring 25 on its radial surface confronting flange surface 26 has an axially projecting annular rib or flange 328 adapted to be engaged in the companion annular recess in the flange 16, whereby to concentrically locate the spacer ring 25 with the gasket ring supported within the inner periphery thereof with respect to the groove 22 in the flange 16. The spacer ring 25, in this form, is secured to the connector flange 16 by a suitable number of circumferentially spaced fasteners or cap screws 330 threadedly engaged in threaded bores 331 circumferentially spaced about the flange 16 and having heads 332 disposed in counterbores 333 provided in the spacer ring, the screws having suitable tool receiving recesses 334, whereby the spacer ring 25 can be clamped against the flange surface 26. The connecting means 29 between the spacer ring 25 and the ring gasket G comprises a radial inward projection 335 at the inner periphery of the connector ring 25 disposed in an annular groove 336 formed in the outer periphery of the ring gasket body 24, the groove 336 being sufficiently wider than the projection 335 that when the side wall 337 of the support ring projection engages one side of the groove, as shown in FIG. 8, there is sufficient space between the other side of the projection and the other side of the groove to enable the ring gasket to shift axially relative to the spacer ring, as seen in FIG. 4, to the extent necessary to enable the effective axial loading of the gasket ring between the opposed flanges 16 and 17.

Another form of retaining means are as shown in FIG. 9, wherein the ring gasket G is supported for axial shifting movement with respect to the support or spacer ring 25 to enable the effective preloaded sealing engagement illustrated in FIG. 4. In this form the spacer ring 25 is adapted to be disposed adjacent to the flange wall 26 and provides the radial face 427 adapted for engagement by the opposing radial face of the connector flange 17 when the connection is made up. A suitable number of rods 430 are adapted to be threaded into radial bores 431 extending through the spacer ring 25 in circumferentially spaced locations. The rods 430 projecting radially outwardly through the gap between the opposed connector flanges, beyond the outer periphery of the flanges so as to enable the support ring 25 and the gasket ring supported thereon by the connector means 29 to be hand held between the flange parts as the connector is being made up. The connector means 29, in this form, comprises a projection or pin 435 on the end of the rod 430 extending through an inner peripheral opening 436 in the spacer ring 25 and projecting into an annular groove or recess 437 formed in the outer periphery of the ring gasket body 24. The projection 436 is adapted to engage one side of the groove 437 to hold the opposing flange groove surface 22a and ring gasket surface 24a in or approximately in engagement, and the groove or recess 437 is sufficiently wide as to allow axial shifting movement of the ring gasket G with respect to the spacer ring 25, to enable the ring gasket to be properly loaded between the connector flanges 16 and 17 and with the flanges held in spaced relation by the spacer ring 25. After the connection is fully made up the rods may be removed.

From the foregoing, it will now be apparent that the several forms of the invention specifically described above provide a simple means for providing a connection between the inner periphery of the support or spacer ring 25 and the outer periphery of the ring gasket body 24 disposed within the spacer ring 25, whereby the ring gasket is enabled to partake of bodily axial motion with respect to the support ring as may be required during axial preloading of the gasket ring between the flanges, each of the connections also being such that the gasket ring can be circumferentially inwardly deformed to any extent necessary during the loading of the gasket ring into sealing engagement between the flanges. Such connections may also be employed in the case of other, specifically different ring gaskets.

I claim:

1. In a connector: a pair of connector bodies having a fluid passage therein when said bodies are connected together, said bodies having opposed radial surfaces with circumferentially continuous grooves circumscribing said fluid passage and defined between inner and outer opposed side walls diverging outwardly from the bottom of the groove, a metal gasket ring in said grooves in sealing and radially inwardly loaded engagement with at least said opposed side walls, retainer means carried by one of said bodies, means connecting said retainer means to said gasket ring and initially holding said gasket ring in position with respect to the groove in one of said bodies to be clamped between said bodies in said grooves with at least said outer opposed side walls loaded against said gasket ring, and means independent of said retainer means clamping said bodies together, said means connecting said retainer means to said gasket ring providing a slidable connection therebetween to enable bodily axial movement of said gasket ring with respect to said connector bodies during loading of said gasket ring, said retainer means being engaged by and clamped between said bodies and limiting the loading of said gasket ring by said opposed side walls.

2. In a connector as defined in claim 1; said retainer means being connected to said one of said bodies.

3. In a connector as defined in claim 1; said retainer means being a spacer ring clamped between said radial surfaces by said clamping means.

4. In a connector as defined in claim 1; said retainer means being a spacer ring clamped between said radial surfaces by said clamping means, said gasket ring having inner peripheral and end walls spaced from said inner side walls of said grooves and from the bottom of said grooves.

5. In a connector as defined in claim 1; said retainer means being a spacer ring clamped between said radial surfaces by said clamping means, and said gasket ring having passage means extending longitudinally thereof between said grooves.

6. In a connector as defined in claim 1; said retainer means comprising a spacer ring clamped between said bodies, said gasket ring being within the inner periphery of said spacer ring, and said means connecting said retainer means to said gasket ring being disposed between the inner periphery of said spacer ring and the outer periphery of said gasket ring.

7. In a connector as defined in claim 1; means connecting said retainer means to one of said bodies, including circumferentially spaced fastener elements engaged between said retainer means and said one of said bodies.

8. In a connector as defined in claim 1; said retainer means comprising an annular flange on said one of said bodies extending about the groove therein.

9. In a connector as defined in claim 1; said retainer means comprising a spacer ring on said one of said bodies extending about the groove therein, said gasket ring being disposed within said spacer ring, and said means providing a slidable connection including radially opposed stop means on the respective rings holding said gasket ring in said position.

10. In a connector as defined in claim 9; said stop means including a member projecting inwardly from said spacer ring and a shoulder on said gasket ring engaged by said member.

11. In a connector as defined in claim 9; said stop means including a plurality of elements carried by said spacer ring, means for moving said elements radially, and said gasket ring having a radial stop surface engageable by said elements when radially inwardly shifted to hold said gasket ring in said position.

12. In a connector as defined in claim 9; said stop means including a plurality of set screws circumferentially spaced about and radially threaded in said spacer ring, and a recess in said gasket ring receiving an end of said set screws.

13. In a connector as defined in claim 9; said stop means including a plurality of plungers circumferentially spaced about and radially shiftable in said spacer ring, a recess in said gasket ring receiving ends of said plungers, means urging said plunger radially inward, and means for retracting said plungers.

14. In a connector as defined in claim 9; said stop means including a projection on the inner periphery of said spacer ring spaced from said one of said bodies, and a projection on the outer periphery of said gasket ring between said projection on said spacer ring and said one of said bodies.

15. In a connector as defined in claim 11; said spacer ring being radially split and resiliently contractible, said spacer ring and said one of said bodies having coengageable tongue and groove means extended circumferentially about said groove in said one of said bodies holding said spacer ring contracted with said stop means in opposed relation.

16. In a connector as defined in claim 11; said spacer ring being radially split and resiliently contractible, said spacer ring and said one of said bodies having coengageable tongue and groove means extended circumferentially about said groove in said one of said bodies holding said spacer ring contracted with said stop means in opposed relation, and including means connecting said spacer ring to said one of said bodies and holding said tongue and groove means engaged.

17. In a connector as defined in claim 11; said spacer ring having a number of circumferentially spaced radially extended threaded bores, said stop means including members threaded in said bores and having end portions projecting radially inwardly from the periphery of said spacer ring and a radially outwardly opening recess in the outer periphery of said gasket ring receiving said end portions.

18. In a connector as defined in claim 17; means connecting said spacer ring to said one of said bodies.

19. In a connector; a pair of connector bodies having a fluid passage therein when said bodies are connected together, said bodies having opposed radial surfaces with circumferentially continuous grooves circumscribing said fluid passage and defined between inner and outer opposed side walls diverging outwardly from the bottom of the groove, a metal gasket ring in said grooves in sealing and radially inwardly loaded engagement with at least said outer opposed side walls, retainer means, means connecting said retainer means to said gasket ring and initially holding said gasket ring in position with respect to the groove in one of said bodies to be clamped between said bodies in said grooves with at least said outer opposed side walls loaded against said gasket ring, and means independent of said retainer means clamping said bodies together, said means connecting said retainer means to said gasket ring providing a slidable connection therebetween to enable bodily axial movement of said gasket ring with respect to said connector bodies during loading of said gasket ring, said retainer means being engaged by and clamped between said bodies and limiting the loading of said gasket ring by said opposed side walls; said retainer means having a number of rods projecting radially past the perimeter of said connector bodies and maually supportable to initially position said gasket ring with respect to said one of said bodies.

20. For use in a connector having connector parts with opposed annular divergent sealing surfaces for receiving and axially and circumferentially loading a soft metal ring gasket: a subassembly comprising a support ring, a soft metal, solid ring gasket within said support ring having divergent inner and outer peripheral sealing surfaces at opposite sides thereof, and connecting means providing a slidable connection between the inner periphery of said support ring and the outer periphery of said gasket ring between said outer peripheral sealing surfaces enabling assembly of said rings to each other and bodily axial movement of said gasket ring in one direction with respect to said support ring and circumferential inward deformation of said gasket ring, and stop means limiting axial movement of said gasket ring in the other direction, said support ring being radially split, said stop means comprising radially projecting abutments between the inner periphery of said support ring and the outer periphery of said gasket ring, said support ring having an annular rib on one side thereof engageable in a groove in one of the connector parts to contract said support ring to dispose said abutments for coengagement, and said support ring having means enabling its attachment to said one of the connector parts.

21. In a connector: a pair of connector bodies having a fluid passage therein when said bodies are connected together, said bodies having opposed radial surfaces with circumferentially continuous grooves circumscribing said fluid passage and defined between inner and outer opposed side walls diverging outwardly from the bottom of each groove, a metal gasket ring in said grooves in sealing and radially inwardly loaded engagement with at least said outer opposed side walls, a spacer ring, means connecting said spacer ring to said gasket ring and initially holding said gasket ring in position with respect to the groove in one of said bodies to be clamped between said bodies in said grooves, and means independent of said spacer ring clamping said bodies together, said connector means providing a slidable connection between said spacer ring and gasket ring to enable bodily axial movement of said gasket ring with respect to said connector bodies during loading of said gasket ring, said spacer ring being engaged by and clamped between said bodies and limiting the loading of said gasket ring by said opposed side walls, said gasket ring being disposed within said spacer ring, and said connector means further including radially opposed stop means on the respective rings holding said gasket ring in said position, said connecting means further including a number of circumferentially spaced radially extended threaded bores in said spacer ring, said stop means including members threaded in said bores and having end portions projecting radially inwardly from the periphery of said spacer ring and a radially outwardly opening recess in the outer periphery of said gasket ring receiving said end portions, said members threaded in said bores being elongated rods projecting radially outwardly from said spacer ring past said bodies.

* * * * *